US008268245B2

(12) United States Patent
Wahl

(10) Patent No.: US 8,268,245 B2

(45) Date of Patent: Sep. 18, 2012

(54) METHODS AND DEVICES FOR DETERMINING ANALYTES IN LIQUIDS OF SMALL VOLUMES

(75) Inventor: Hans-Peter Wahl, Huenenberg (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 1754 days.

(21) Appl. No.: 10/926,926

(22) Filed: Aug. 26, 2004

(65) Prior Publication Data

US 2005/0106742 A1 May 19, 2005

(30) Foreign Application Priority Data

Aug. 30, 2003 (EP) .................................... 03019611

(51) Int. Cl.
*G01N 21/00* (2006.01)

(52) U.S. Cl. ..................... 422/81; 422/82.01; 422/82.02

(58) Field of Classification Search ........................ None
See application file for complete search history.

(56) References Cited

U.S. PATENT DOCUMENTS

| | | | |
|---|---|---|---|
| 4,517,160 A | 5/1985 | Galle et al. | |
| 5,716,584 A * | 2/1998 | Baker et al. | 506/40 |
| 5,776,103 A * | 7/1998 | Kriesel et al. | 604/132 |
| 5,788,064 A | 8/1998 | Sacherer et al. | |
| 6,071,478 A * | 6/2000 | Chow | 422/81 |
| 6,352,630 B1 | 3/2002 | Frenkel et al. | |
| 2002/0033193 A1* | 3/2002 | McNeely et al. | 137/825 |
| 2002/0187564 A1 | 12/2002 | Chow et al. | |

FOREIGN PATENT DOCUMENTS

| | | | |
|---|---|---|---|
| DE | 10117771 | A1 | 10/2002 |
| EP | 0779226 | A1 | 6/1997 |
| JP | 2005130851 | A | 5/2005 |
| JP | 2007218874 | A | 8/2007 |
| JP | 2007218875 | A | 8/2007 |
| JP | 2007285834 | A | 11/2007 |
| JP | 2007319097 | A | 12/2007 |
| JP | 2007322290 | A | 12/2007 |

(Continued)

OTHER PUBLICATIONS

Cho, S. K. , Moon, H., Kim, C.J., "Creating, Transporting, Cutting, and Merging Liquid Droplets by Electrowetting-Based Actuation for Digital Microfluidic Circuits", Journal of Microelectromechanical Systems, vol. 12, No. 1, Feb. 2003, 70-80.

Washizu, M., "Electrostatic Actuation of Liquid Droplets for Microreactor Applications", IEEE Transactions on Industry Applications, vol. 34, No. 4, 1998, 732-737.

(Continued)

*Primary Examiner* — Yelena G Gakh
(74) *Attorney, Agent, or Firm* — Dinsmore & Shohl LLP

(57) ABSTRACT

A method for determining analytes in a liquid is provided comprising applying a liquid volume to be examined to a substrate of a transport plane; moving the liquid volume to be examined on the substrate of the transport plane to a site of examination; contacting the liquid volume to be examined with at least one sensory element, wherein the sensory element is located in a detection plane opposite to the substrate of the transport plane; and determining an analyte in the liquid volume to be examined by the sensory element, wherein the liquid volume is only in contact with the substrate of the transport plane during the step of moving the liquid volume to be examined on the substrate of the transport plane to a site of examination. The application also concerns a device for determining analytes in a liquid corresponding to the method according to the invention.

20 Claims, 8 Drawing Sheets

FOREIGN PATENT DOCUMENTS

| | | | |
|---|---|---|---|
| JP | 2007322291 | A | 12/2007 |
| WO | WO 00/51720 | A | 9/2000 |
| WO | WO 01/20781 | A1 | 3/2001 |
| WO | WO 02/18785 | A1 | 3/2002 |
| WO | WO 2004/101152 | A1 | 11/2004 |
| WO | 2007139056 | A1 | 6/2007 |
| WO | 2007097229 | A1 | 8/2007 |
| WO | 2007097230 | A1 | 8/2007 |

OTHER PUBLICATIONS

Wixforth, A., Scriba, J., Gauer, C., “Flatland fluidics”, BioMEMS, mstnews5/02, 2002, 42-43.

Kim, C.J., “Micropumping by Electrowetting”, Proceedings of 2001 ASME International Mechanical Engineering Congress and Exposition, Nov. 11-16, 2001, NY.

* cited by examiner

METHODS AND DEVICES FOR DETERMINING ANALYTES IN LIQUIDS OF SMALL VOLUMES

BACKGROUND OF THE INVENTION

The present invention relates to methods and devices for determining analytes in a liquid.

The analytical detection and determination of the concentration of certain biologically and medically relevant substances from complex samples is a basis for modern medical diagnostics. In recent years methods and processes have been developed to obtain exact analytical results with sample volumes that are becoming smaller and smaller especially by the introduction of microanalytical methods. The "lab-on-a-chip" systems that are being used to an increasing extent operate with quantities of liquids in the micro to nano liter range which have to be moved in these systems to a spatially defined analytical area which is the site of the examination. The actual determination of the analyte is then carried out at these sites, usually with the aid of specific sensors.

Conventional "lab-on-a-chip" systems generally consist of microstructured closed channels which transport the liquid to the actual sensory elements. Mechanical micropumps or electrokinetic methods are usually used to move the liquids. Thus liquids can for example be moved in these channels by electroosmosis, hydrostatic pressure differences, capillary forces or centrifugal forces. Other methods for transporting very small amounts of liquid are electrowetting as described for example in "Electrostatic Actuation of Liquid Droplets for Microreactor Applications" (Washizu M. in IEEE Transactions of Industry Applications 34(4):732-737, 1998), "Creating, Transporting, Cutting and Merging Liquid Droplets by Electrowetting-Based Actuation for Digital Microfluidic Circuits" (Cho S. K., Moon H. Kim C. J. in Journal of Microelectromechanical Systems 12(1):70-80, 2003) or "Micropumping by electrowetting" (Kim C. J. in Proceedings of 2001 ASME International Mechanical Engineering Congress and Exposition, Nov. 11-16, 2001, New York, N.Y.), and the transport of liquids on surfaces with the aid of acoustic surface waves, so-called surface acoustic waves (SAW) as described for example in "Flatland fluidics" (Wixforth A., Scriba J. and Gauer C. in mstnews 5/02, pages 42-43).

Analytes are usually determined in microanalytical systems with the aid of sensors that are integrated in the channels of the chips. The measuring methods of these sensors in the previously used microanalytical methods are based in particular on spectroscopic methods such as fluorescence or absorption measurements, electrochemical methods, conductivity, luminescence or electrochemiluminescence methods and detection methods using waveguide sensors. In contrast, biosensors, ion-selective electrodes and other sensors that are widely used in macroscopic routine diagnostics have hitherto proven to be unsuitable for routine use in microanalytical systems. The reasons for this are, in particular, the high manufacturing costs of such microstructured sensors and electrodes and the fact that so far no satisfactory method has been found to move liquids in these systems by active pumping from outside. Other microanalytical devices are in particular protein arrays and arrays for determining nucleic acids. Furthermore, there are sensor modules which are incorporated into clinical and/or chemical analyzers. These are especially modules for determining electrolytes and other analytes such as glucose or lactate. However, these methods that are established in laboratories usually use considerably larger sample volumes.

The microanalytical devices that are commonly used are almost exclusively composed of microfluidic channels with the exception of arrays for protein and nucleic acid analysis. These closed channels have a width and depth of a few micrometers but are usually very long so that the volumes of these channels is large relative to their cross-section. Consequently, a considerable proportion of the sample volume in these systems cannot be used to determine the analyte in the sensory areas of the system and represents an unusable dead volume. Thus there are fundamental limits to a further reduction of the required amount of sample in these channel systems. Furthermore, such channels have the major disadvantage that the surface which is in direct contact with the sample is very large relative to the volume. Thus there is a high probability that components of the liquid will remain behind on the surface of the channels and can thus contaminate samples which are moved in the same channels for subsequent measurements. Hence such systems can often only be used as disposable articles due to the said carry-over problems. Another disadvantage of such microanalytical systems is that mixing liquids in microchannels is either impossible or very complicated and air bubbles that may occur can easily bring the flow in the channels to a standstill. Hence such systems are relatively trouble-prone and expensive to manufacture so that for cost reasons they often have to be used several times in routine operations which, however, for the above-mentioned reasons (carry-over problems) is at present not possible.

At present, ion-selective electrodes are used above all in macroscopic analytical systems and especially in modules for electrolyte analysis in clinical and chemical analytical systems. Such macroscopic detection systems have considerable disadvantages. Thus in addition to the considerably larger sample volumes, such modules and systems require numerous tubes, valves and pumps to control the flow of liquids within these systems. For example, air segments have to be introduced into the stream of liquid in order to clean the tubes and sensors between individual measurements and calibrations. Additional sensors and, in particular, light barriers or conductivity sensors are required to control the liquid flows in order to ensure that the air segments are correctly introduced and discharged. Although, like the microanalytical systems with microfluidic channels, only a relatively small volume is necessary for the actual determination of the analyte, an approximately 20-fold larger volume of liquid has to be used in the current systems in order to ensure a measurement that is free from carry-over. Hence such systems are often very susceptible to faults and require a large amount of maintenance. The construction described above does not allow the manufacture of instruments that are easy to handle and portable which could be used ideally for a doctor's laboratory or near patient diagnostics. Another disadvantage of the instruments described above is their high manufacturing costs since all systems and modules have to be assembled from many different components. In contrast to macroscopic analytical systems, there are at present no ion-selective electrodes for microanalytical methods and devices which are suitable for multiple measurements in routine operation like their macroscopic analogues.

Microarrays are a special case of microanalytical systems. Microarrays are understood as analytical systems which have many sensory elements on a support substance that are usually arranged at regular distances to one another so that they can be used for many simultaneous or staggered determinations. Microarrays are used especially to analyse proteins and nucleic acids. It is difficult to regenerate such arrays and hence such systems are also not suitable for multiple use for the above-mentioned reasons.

Some microarrays for protein determination operate with planar surfaces. However, these arrays require relatively large volumes. Thus, for example, about 50 μl sample liquid has to be incubated in such systems in order to allow the analyte to bind to the detection molecules. In order to prevent a depletion of the analyte, the sample has to be mixed thoroughly which is a major technical problem.

All these arrays are intended to be used only once. Usually, flat arrays with large volumes are used in which mixing during incubation is also a technical challenge. The analyte is usually detected by optical methods which require expensive and complex optical detection systems so that these detection methods can only be carried out in a few special laboratories with high quality technical equipment.

Methods and devices have been described to solve these technical problems which can transport liquids especially in microanalytical systems.

The German laid-open document DE 10117771 A1 describes methods and devices for manipulating small amounts of liquids with the aid of acoustic surface waves. The object of this patent application described in the laid-open document is to localize and optionally to mix liquids on a solid chip. For this purpose devices and methods are described which can move liquids by means of acoustic surface waves over a flat substrate towards so-called functionalized areas. A chemical or biological reaction can, for example, take place in such functionalized areas. For this purpose, DE 10117771 A1 describes devices in which such functionalized areas are located at certain sites directly in or on the surface of the solid chip which, among others, can be used as sensors in analytical methods. The functionalized areas for analysing the liquid are directly integrated into the substrate of the solid chip on which the liquid is transported, i.e., the devices that are relevant for liquid transport and the devices that are relevant for determining the analyte in the liquid are combined in a single plane, the transport plane.

However, it is very costly and technically complicated to manufacture and also to purify such multifunctional surfaces and hence such systems can neither be used as disposable articles nor in routine analytics. Furthermore, the sensors integrated into the surface of the carrier chips represent inhomogeneities in the surface of the carrier substrate, for example, due to different surface wetting properties or spatial elevations or depressions. This greatly limits the uniform transport of liquids over the surface of the carrier substrate and thus complex controls and/or additional forces are required to compensate for these inhomogeneities and to enable a uniform and effective transport of the liquid.

DE 10117771 A1 also describes arrangements in which two solid surfaces oppose one another and between which the liquid to be examined is located and in contact with both surfaces. In this case, the devices for generating the acoustic surface waves and the functionalized areas can be present on the two different surfaces. However, even in such arrangements the transport of liquid on the substrate of the transport plane is not independent of the functionalized areas since the liquid volume is always in contact with both surfaces. Additional interactions occur with such arrangements and, in particular, surface effects, interfacial effects and capillary effects between the liquid and the two contacted surfaces and, hence, such arrangements are usually not suitable for transporting liquids over the substrate but can be used especially to mix a liquid.

SUMMARY OF THE INVENTION

It is against the above background that the present invention provides certain unobvious advantages and advancements over the prior art. In particular, the inventor has recognized a need for improvements in methods and devices for determining analytes in a liquid.

Although the present invention is not limited to specific advantages or functionality, it is noted that the present invention provides microanalytical methods and devices which meet the requirements of cost-effective and user-friendly routine analytics and are suitable for multiple reuse.

In accordance with one embodiment of the present invention, a method for determining an analyte in a liquid is provided comprising applying a liquid volume to be examined to a substrate of a transport plane; moving the liquid volume to be examined on the substrate of the transport plane to a site of examination; contacting the liquid volume to be examined with at least one sensory element, wherein the sensory element is located in a detection plane opposite to the substrate of the transport plane; and determining an analyte in the liquid volume to be examined by the sensory element, wherein the liquid volume is only in contact with the substrate of the transport plane during the step of moving the liquid volume to be examined on the substrate of the transport plane to a site of examination.

In accordance with another embodiment of the present invention, a device for determining analytes in a liquid is provided comprising a substrate of a transport plane over which a liquid volume to be examined is moved from a sample application site to a site of examination, and at least one sensory element configured for determining an analyte. The sensory element is located in a detection plane that is opposite to the transport plane. The liquid volume is only in contact with the substrate of the transport plane during its movement to the site of examination and is only additionally brought into contact with the sensory element in order to determine the analyte.

These and other features and advantages of the present invention will be more fully understood from the following detailed description of the invention taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which.

Figure 1:
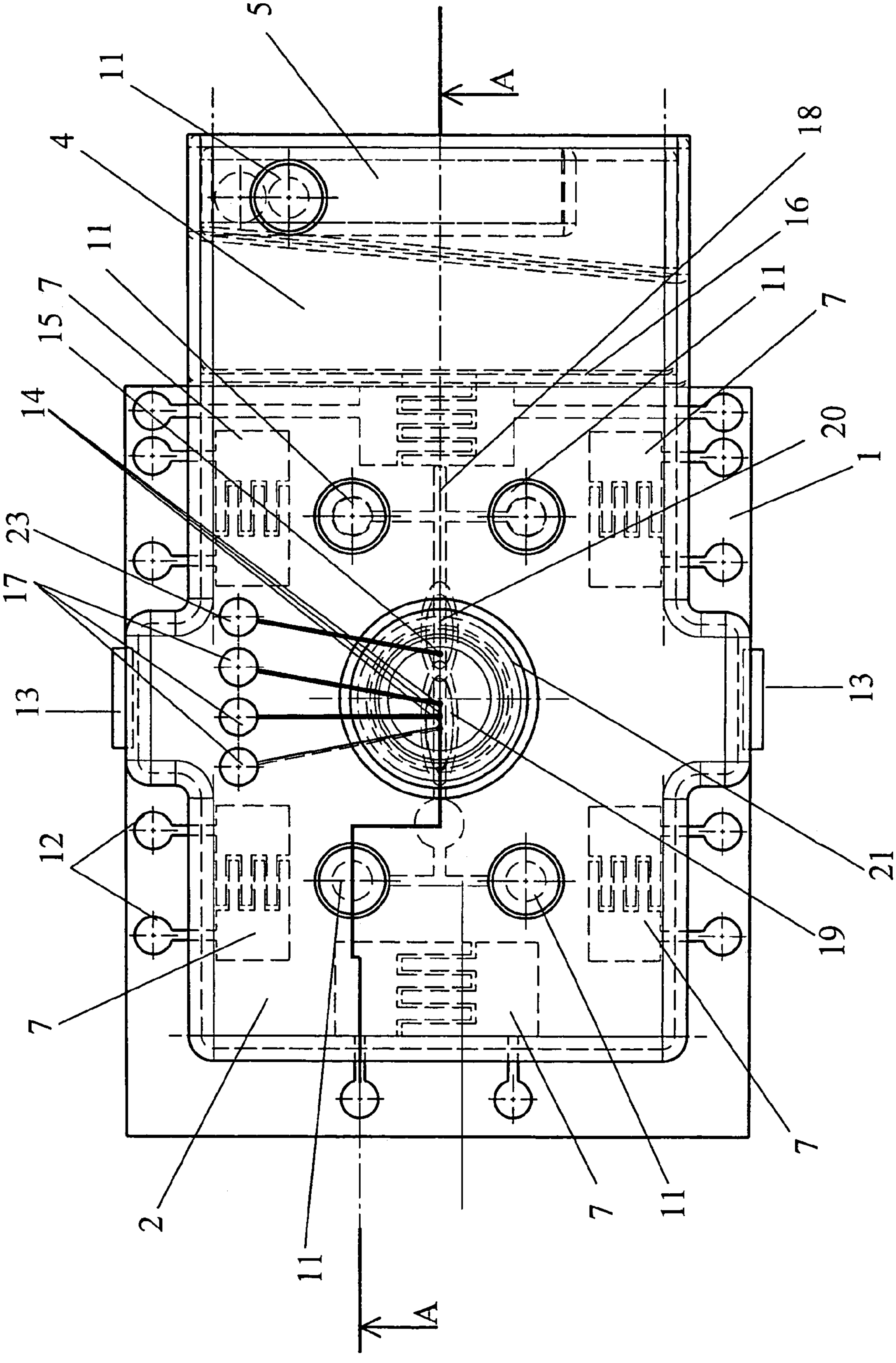
FIG. 1 shows a top-view of a device according to one embodiment of the present invention which is suitable for determining analytes such as ions with the aid of integrated ion-selective electrodes.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiment(s) of the present invention.

DETAILED DESCRIPTION OF THE INVENTION

The present invention is directed to methods and devices for determining analytes in liquids which are characterized in that the liquid to be examined is applied to a substrate and the liquid volume to be examined is moved on the surface of the substrate, the so-called transport plane, to the site of examination wherein the liquid is only in contact with the substrate of the transport plane during transport. The movement can be effected by methods such as acoustic surface waves or electrowetting. In addition, the methods and devices according to the present invention are characterized in that they have at least one sensory element and optionally additional analytical units which are located separately from the substrate of the transport plane in a second plane that is opposite to the substrate, the so-called detection plane. This detection plane is designed such that the liquid volumes are not in contact with the detection plane or their movement is not disturbed by the detection plane during their movement towards or away from the site of examination. Thus the methods and devices according to the present invention ensure a uniform and undisturbed movement of the liquid volume on the transport plane. At the position which represents the site of examination, the detection plane can have special shaped portions or devices which only make contact with the liquid to be examined at this defined site of examination and thus enable a determination of analytes in the liquid. This contact surface can in particular be designed such that there is a permanent reduction of the distance between the sensory element or the detection plane and the transport plane at the sites of examination, or that the sensory element or the detection plane are designed to be movable so that the sensory element can then be temporarily brought into contact with the liquid volume to be examined when it is at the site of examination.

Furthermore, the transport plane and the detection plane can be connected to form a device which can be placed in an external apparatus. The external apparatus can be used especially to control the movements of the liquid volumes to be examined, make electrical and/or fluidic contacts with the device according to the present invention, and is optionally able to receive a part of the analytical unit.

A typical embodiment of the present invention consists of a closed device which comprises the substrate of the transport plane as the bottom surface and a cover which typically has side walls in order to construct a closed device. The cover can also have openings for applying liquids which are closed by a cover and in particular by a pierceable septum. At least one sensory element is integrated into the cover of the housing. Hence, in most cases the cover corresponds to the detection plane of the device. In this case the sensory element can be integrated into or mounted on the surface of the cover facing the transport plane directly at the site of examination.

In other embodiments the movable sensory element is briefly moved from a transport position into a measuring position in order to determine the analyte at the site of examination. The transport position corresponds to a spatial position of the sensory element in which it is not in contact with the liquid volume so that transport of the liquid volume over the transport plane is not affected by the sensory element. The measuring position corresponds to a spatial position of the sensory element in which its distance to the transport plane is reduced compared to the transport position and the sensory element is in contact with the liquid volume so that the analyte can be determined by means of the sensory element. The substrate of the transport plane can have additional devices to generate a movement of the liquid volume to be examined and in particular interdigital electrodes to generate acoustic surface waves or electrodes like those used for methods based on electrowetting. However, the devices which generate the forces required to move liquids do not necessarily have to be directly attached to the substrate of the transport plane in the case of transport by acoustic surface waves, but rather it is also possible that the devices for generating these forces are located outside of the substrate, for example, as a component of an external control device. In this case, the forces that are generated externally are then coupled into the transport plane, for example, by means of electrical fields or mechanical oscillations. This is particularly advantageous when it is intended to use disposable devices because complicated devices for generating a movement on the transport plane itself are unnecessary which considerably reduces the production costs.

The subdivision of the devices according to the present invention into a plane which is used to move the liquid volumes to be examined (transport plane) and a plane which is used for the analytical examination of the liquid volumes (detection plane) allows an undisturbed movement of the liquid volume on the substrate of the transport plane and, on the other hand, allows these two planes to be manufactured in two different processes. These two manufacturing processes do not have to be compatible. Thus, for example, the transport plane can be manufactured independently of the detection plane. These two elements are not brought together until final assembly, typically in the form of a closed device. Various liquid volumes to be examined and also calibration solutions, reference solutions, rinsing or cleaning solutions, solutions with standardized analyte concentrations, so-called standards, or reagents can be applied to the transport plane through openings in the housing, for example, by pipetting or injection. In addition, the liquid volumes can also be applied to the transport plane by means of coupled fluidic systems such as capillaries and dispensers. By appropriate control of the devices that generate the necessary forces to move the liquid volumes, one is able to transport the liquid volumes to any desired predefined site on the substrate of the transport plane and, in particular, to the site of examination.

In a typical embodiment, the device according to the present invention additionally can have a waste container which is connected to the device by an orifice and thus belongs to the closed area of the device. The liquids that are transported into the waste container through the orifice can be separated by this orifice from the transport and detection plane to prevent a backflow into the sensory area and thus an impairment of subsequent measurements.

When determining analytes in liquids often only very small measurement signals are generated which can easily be falsified by ambient influences and interfering factors. Hence, the sensory areas or the entire device can be screened from such external interfering influences typically by means of a Faraday's cage in order to keep the signals free from interfering electrical influences or to protect optical detectors from direct light or scattered light by means of a radiation-reducing covering.

Analytes that can be determined by a method according to the invention or by the corresponding devices within the sense of the present invention are all particles that are of interest in analytics and especially in clinical diagnostics. The term "analyte" encompasses in particular atoms, ions, molecules and macromolecules, especially biological macromolecules such as nucleic acids, peptides and proteins, lipids, metabolites, cells and cell fragments. The analytes can be free as well as bound to particles especially artificial particles such as so-called beads.

Liquids in the sense of the present invention can be pure liquids and homogeneous and heterogeneous mixtures such as dispersions, emulsions or suspensions. In particular, the liquids can contain atoms, ions, molecules and macromolecules, in particular, biological macromolecules such as nucleic acids, peptides and proteins, lipids, metabolites or other biological cells or cell fragments. Typical liquids to be examined of biological origin are blood, plasma, serum, urine, cerebrospinal fluid, lacrimal fluid, cell suspensions, cell supernatants, cell extracts, tissue lysates or the like. Liquids can, however, also be calibration solutions, reference solutions, rinsing or cleaning solutions, reagent solutions or solutions containing standardized analyte concentrations, or so-called standards. Liquid volumes in the sense of the present invention can in principle have any shape and size but are typically present in the form of round or flattened drops having volumes in a range of 100 nl to 10 μl. In particular, liquid volumes in an elongate form are also possible which can cover several adjacent sensory elements.

Sensory elements in the sense of the present invention are all systems for determining analytes which can determine analyte-specific chemical, biochemical, biological or physical quantities, or changes thereof. Within the scope of the present invention the term "sensory element" is not restricted to a purely technical definition of a sensor, but rather encompasses all systems that enable an analyte to be detected in a direct or indirect manner.

Thus, especially specific binding partners of the analyte and, in particular, labelled binding partners that enable the analyte to be detected by a specific interaction with it (e.g., antibodies, nucleic acids with complementary sequences, complexing agents), or specific reaction partners of the analyte which specifically react with the analyte and, thus, by detecting the corresponding reaction products or educts, indirectly aid in the determination of the analyte (e.g., substrates, enzymes) are also understood as sensory elements. According to the present invention, these sensory elements are present at the site of examination, typically in an immobilized form, and enable the specific detection of the analyte at this position. It is also possible that the reagents required to determine the analyte are present at this site in a dry chemical form. It should be noted that the physical site of detection by means of a physical or chemical sensor does not necessarily have to correspond with the sensory elements at the site of examination, especially in the case of indirect detection methods. Thus, when peptidic analytes are detected by means of fluorescent-labelled antibodies, the resulting fluorescence radiation is detected by an optical sensor that can also be located outside of the actual device according to the present invention, in a suitable embodiment of the invention, whereas the detection of the analyte by the antibodies as the sensory elements only occurs at the site of examination. However, sensory elements can also be conventional sensors, especially electrochemical sensors, biosensors, optical sensors such as absorption or fluorescence detectors, and immunological sensors such as optodes, waveguide sensors and evanescence field laser spectrometry sensors. Sensors are also encompassed which can determine physical quantities such as sensors that determine the viscosity, density or mass of a liquid. There are of particular interest for reactions in which these properties of the liquid change during the course of an analyte-specific reaction. Examples of this are coagulation reactions or methods which detect the attachment of analyte molecules by means of the resulting change in mass.

Sensors can be present in all possible geometric embodiments, in particular, as pointed sensors, as flat sensors, or as thick film sensors. Pointed sensors are typical since only a minimal residual volume of the liquid to be examined adheres to them when the sensor is moved away and thus carry-over artefacts can be largely avoided.

In the case of analytes that can be directly determined with sensory elements in the liquid volume to be examined, the liquid volume is moved according to the present invention to the site of examination. This can typically be achieved by firstly generating individual liquid volumes and moving these liquid volumes to the site of examination. This method is particularly suitable for multiple measurements and use in routine operation. In this case, a plurality of liquid volumes to be examined are moved successively to the respective site of examination. Once an individual determination is completed the already examined liquid volume is moved away from the site of examination and can be provided for further examinations or collected in a waste container. Another liquid volume can now be moved to the vacant site of examination in which case the transport of the already examined liquid volume away from the site and the transport of the liquid volume to be examined to the site can occur simultaneously or successively. Such process steps can also be carried out with calibration solutions, reference solutions, rinsing or cleaning solutions, reagent solutions or solutions containing standardized analyte concentrations.

In the case of analytes that cannot be determined with sensors directly in the liquid to be examined, one often requires additional reagents to determine the analyte.

A special characteristic of such methods is that the analyte is determined indirectly by the detection of a specific interaction with a binding partner, especially a labelled binding partner in the form of immunoassays or detection methods using polymerase chain reactions, or a specific reaction of the analyte with detection reagents especially in the form of chemical or enzymatic reactions or a specific change of a physical or chemical quantity in particular the viscosity. In order to determine the analyte, a volume of the liquid to be examined and a volume of the reagent solution is, for example, brought into contact by moving these liquid volumes towards one another, for example, by means of suitably controlled acoustic propulsion surface waves so that they ultimately combine to form a common liquid volume. It is particularly advantageous when the combined liquid volumes are subsequently intermixed in order to enable a rapid and complete reaction of the analyte with the reagents and thus a determination of the analyte that is as accurate as possible. Suitably controlled acoustic surface waves can be used in particular for the mixing. The liquid volumes can be contacted and mixed directly at the site of examination or this can be carried out previously in another area of the device so that in the latter case this mixture is moved to the site of examination optionally after holding it for a certain reaction time.

Reagent solutions required to determine the analyte as well as calibration solutions, reference solutions, rinsing or cleaning solutions or solutions containing standardized analyte concentrations can be added to the device through special openings, in particular through an already available sample application septum or through a septum that is specially provided therefor. The application of the solutions described above does not necessarily have to be carried out by pipetting or injecting through a septum, but rather it is possible in a further embodiment of the present invention to keep the liquids in containers within or outside the housing which are then brought into the housing or released there at defined time points, for example, with the aid of a microdispenser or piezo dispenser. This has the advantage that all liquids that are required to determine the analyte can be already available in a device and only the liquid to be examined has to be supplied. In particular, additional reagent solutions can be applied by means of a container mounted on the cover of the housing which is connected with the chamber by means of a dispenser.

The liquid volumes are typically present in the form of round or flattened drops, but volumes are also possible in an elongate form which can cover several adjacent sensory elements. This embodiment can be used particularly well if several sensory elements have to be simultaneously in contact with the liquid volume to be examined as is for example the case for the electrochemical measurement of electrolytes. In this case one generally uses one or more measuring electrodes and a reference electrode with a reference electrolyte. If a volume of the liquid to be examined and a volume of a reference electrolyte solution are moved towards one another and brought into contact, the two liquid volumes are firstly intermixed purely diffusively and thus very slowly without additional mixing forces. This is particularly advantageous because at this time, directly after contacting the liquid volumes, the two partial volumes are in an electrically conductive connection without effectively intermixing. The liquid volume of the liquid to be examined is typically in contact with one or more measuring electrodes and the liquid volume containing the reference electrode is typically in contact with the reference electrode so that the analyte can be exactly determined after the measuring signals have settled.

The device according to an embodiment of the present invention is typically built into a closed housing which is suitable for multiple use. This closed design prevents evaporation of liquids and thus a falsification of the concentration of the analyte. Moreover, in a typical embodiment it contains a waste vessel into which examined liquids as well as reagent solutions, calibration solutions, reference solutions, rinsing or cleaning solutions, and solutions containing standardized analyte concentrations can be transported after they have been used. In particular, the waste container can be designed such that the used liquids can no longer reach the sites of examination and/or falsify other analyte determinations. This can, for example, be achieved by a mechanical orifice. Furthermore, the used samples can be adsorbed for example by means of a fleece or sponge. This ensures that the air humidity in the device according to the invention is kept at a constant high level thus preventing the evaporation of small volumes of liquid without previous determinations affecting subsequent determinations of analytes.

In another embodiment, the devices according to the present invention or parts of the devices are designed such that the devices or parts of the devices and, in particular, the sensory elements are intended for single use. This embodiment is particularly suitable for determining analytes where carry-over problems can occur.

The present invention also encompasses embodiments which are suitable for single as well as multiple determinations of analytes in liquids as a modular building block system. It is particularly advantageous for these embodiments that the transport plane and the detection plane can be manufactured using different materials and methods and do not have to be assembled until the analyte determination is carried out. Moreover, the transport plane and detection plane do not have to be directly joined together, for example, by spacers or a common housing, but rather they can be firstly present independently of one another and only brought into common contact with the liquid volume to be examined when the analyte is actually determined. In particular, embodiments are advantageous in which the substrate of the transport plane is used as a multiple-use substrate which transports many liquid volumes to the corresponding sites of examination, and the detection plane is designed for single use especially in the case of sensory elements which are based on irreversible reactions and can thus only be used once. Examples of this are glucose sensors based on optical detection methods or sensors which are based on immunological methods or DNA hybridization. In this case the detection plane can be designed such that it contains only one sensory element and is replaced for each determination whereas the transport plane can be used to move many liquid volumes for many analyte determinations. However, the detection plane can also be designed such that it contains a plurality of sensory elements each of which can only be used once and are located at different and separate sites of determination such that a different sensory element is used for each analyte determination. An advantage of this embodiment is that a plurality of analyte determinations can be carried out successively in the same device using sensory elements that can be used only once.

In accordance with another embodiment of the present invention, the device is designed such that methods for determining analytes in liquids can be used which comprise one or more dry chemistry steps. An example of this is reflectometric glucose determination on test strips. Dry chemistry methods are methods which contain at least one reagent in a dry form. In this case it must be ensured that the humidity in the device is as low as possible. This can be achieved especially when the device or components connected thereto such as a waste container contain a moisture-absorbing and/or liquid-absorbing agent such as silica gel where the moisture-absorbing and/or liquid-absorbing agent can be wrapped in a membrane or fleece. This also allows the use of moisture-sensitive reagents to determine analytes in liquids. Such reagents present in dry form can in particular be present in the form of a spot at the site of determination or, in the case of an indirect involvement in the determination of the analyte, be immobilized at other sites in the device. If such devices which use dry chemistry reagents are to be used for a plurality of determinations, a plurality of spots which can be contacted independently of one another with different liquid volumes to be examined can for example be placed at different sites in the device. Thus, dry chemistry reagents can also be accommodated in multi-use devices without the dry chemistry reagents for subsequent determinations being damaged by liquid volumes used in previous determinations. This includes various embodiments. Thus, for example, one application site can be provided at which several liquid samples to be examined are applied, and several spatially separate sites of examination are provided which all use the same detection method such that analyte determinations are carried out in an identical manner at the various sites of examination. This is particularly advantageous when a plurality of identical analyte determinations are to be carried out successively on one device. In another embodiment, several sites of application and several sites of examination which all use the same detection method may be present. This is particularly advantageous when several identical analyte determinations are to be carried out simultaneously on one device. In another embodiment, the device may contain one site of application and several sites of examination which enable the detection of different analytes. This is particularly advantageous when it is intended to determine several different analytes from one sample. For this purpose the sample is firstly divided into several liquid segments which can then be subsequently transported to the various sites of examination. In another embodiment, the device can also contain several sites of application and several sites of examination which enable the detection of different analytes.

According to the present invention, the sensory element or the detection plane is only contacted with the liquid volume to be examined at the site of examination. In this area the detection plane can be shaped such that there is a permanent reduction of the spacing between the sensory element and the transport plane at the site of examination, or that the sensory element or the detection plane are designed to be movable such that the sensory element is only contacted with the liquid volume to be examined when it is present at the site of examination. The following solutions are possible for this.

The device can be shaped such that the distance between the detection plane and the transport plane at the site of examination is permanently reduced, typically due to the fact that the sensory elements protrude from the actual detection plane towards the transport plane. In particular, the distance between the detection plane and transport plane outside of the sensory area is larger than the vertical dimension of the liquid volume within the sensory area, i.e., at the site of examination it is smaller than or equal to the vertical dimension of the liquid volume. This enables a movement of the liquid volumes outside the sensory areas which is not affected by the sensory elements or by the detection plane. In contrast, the liquid volumes only interact with the sensory elements at the constrictions at the sites of examination. The actual determination of the analyte occurs at these sites and the respective liquid volume typically does not change its position during the determination. This can, for example, be achieved by switching off the devices which generate the forces that move the liquid volumes during the analyte determination. After the analyte determination is completed, the forces can then be applied again which move the liquid volumes away from the sites of examination for example into a waste container or to another site of examination whereby the movement after leaving the examination again occurs exclusively in contact with the transport plane. Within the scope of this embodiment it is advantageous that such permanent constrictions of the distance between the detection plane and transport plane can be achieved without additional technical means and thus cost-effectively by suitable topologies of the detection and/or transport plane. Such topologies may be tips, elevations, ramps and such like.

The device can also be designed such that the distance between the sensory element or the detection plane and the transport plane can be temporarily reduced at the site of examination. For this purpose the sensory element or the detection plane are firstly at a distance from the transport plane while the liquid volumes are moved over the transport plane and this distance is larger than the vertical dimension of the liquid volume. This corresponds to the previously described transport position. This enables a movement of liquid volumes to the site of examination that is not influenced by the sensory elements or the detection plane. If the liquid volume to be examined is at the site of examination, the movement of the liquid volume is stopped and the distance of the sensory element or of the detection plane to the liquid volume to be examined is shortened by suitable methods to such an extent that a direct contact occurs between the liquid volume and sensory element. In particular, the detection plane and the transport plane can be temporarily moved towards one another, for example, by means of an electric drive, in order to reduce the distance. In other embodiments the entire detection plane is not moved towards the transport plane but rather only the sensory areas for example by means of movably mounted sensor electrodes which are brought into contact with the liquid volume to be examined by external drives in order to determine the analyte. This corresponds to the aforementioned measuring position. After the analyte determination the detection plane or the sensory element is again moved away from the liquid volume into the transport position and forces are applied which move the liquid volume away from the sites of examination, for example, into a waste container or to another site of examination where the movement after leaving the examination again occurs exclusively in contact with the transport plane.

The methods and devices according to the present invention can also be used to determine analytes by measuring physical and physico-chemical parameters. For example, they can be used to determine global coagulation parameters such as prothrombin time or activated partial thromboplastin time. This measurement can, on the one hand, be carried out by means of electrochemical reactions using appropriate electrochemical sensors as described for example in the U.S. Pat. No. 6,352,630 B1. On the other hand, the determination can also be carried out by means of a viscosity measurement. In addition to the known methods such as optical methods or methods using magnetic particles, this can also be carried out with sensors that are based on acoustic surface waves. The device can be used several times when the device is regenerated after the required measuring signal has been reached typically with the aid of reagents known to a person skilled in the art which prevent the formation of a complete coagulation. These reagents can be transported to the reaction mixture in a liquid form on the transport plane also using the methods and devices according to the present invention and especially by means of acoustic surface waves and, after mixing with this reaction mixture, be transported into a waste container.

The methods and devices according to the present invention can also be used to perform homogeneous and heterogeneous immunoassays. In the case of homogeneous immunoassays the reaction can in particular occur by measuring the turbidity or the optical density with optical sensors. Furthermore, the sensor can be designed as a waveguide especially when measuring the reaction by means of evanescence field laser spectrometric methods. In the case of heterogeneous immunoassays specific antibodies can be used which are, for example, bound to magnetic particles. The assays are then carried out in a manner known to a person skilled in the art.

The device can also be designed such that it enables analyte-specific detection reactions to be carried out with one or more separation steps or wash steps. For this purpose one or more substances to be separated are provided with a specific label or probe, for example, by binding to magnetic particles or labelled antibodies. In the case of a magnetic label the required separation of the substances, for example, of bound and unbound analytes in a so-called bound-free separation takes place by applying a magnetic field from outside at a certain position of the device which retains the magnetic particles with the substances bound thereto and thus enables the particles to be washed or the medium to be replaced. The reagents and media can also be transported in a liquid form on the transport plane especially by means of acoustic surface waves. In particular, they can be firstly transported to the site of the bound-free separation and, after the washing steps are completed, either be measured at the same site or at another site. The measurement can be carried out there using known sensors (fluorescence sensors, luminescence sensors or others). In particular, this enables a complete immunoassay to be carried out in a single closed device. The device can be used several times if the device is cleaned or regenerated similarly to the above-mentioned methods after the required measuring signal has been obtained. The consumed reagents can be transferred into a waste container.

The methods and devices according to the present invention can also be used in methods for determining analytes which are based on biological or chemical amplification reactions. Often only traces of cellular material are available for genetic determinations or DNA comparisons of living beings which is why methods are required to determine these molecules which amplify nucleic acids in adequate quantities in vitro. The polymerase chain reaction (PCR) which can be used to multiply DNA fragments from tiny traces of the starting material as often as desired and in a short period is a special example of this. One PCR cycle consists of three discrete temperature steps: 1. Denaturation: The DNA to be amplified melts when it is heated to ca. 95° C. and single strands are obtained. 2. Annealing: Rapid cooling to ca. 55° C. prevents the reassociation of the single strands and the primers (2 different oligonucleotides in opposite orientations) attach themselves to the corresponding complementary sections of the DNA strand. 3. Extension: The DNA polymerase extends the strand at ca. 72° C. starting from the primer and thus completes the single strand to form a double strand by incorporation of nucleotides. These new molecules then serve again as a template in the next cycle. There is an exponential amplification of the starting DNA and the material is identically copied many times in several, usually 20 to 50 cycles.

The devices according to the present invention can be designed such that they are suitable for performing such PCR tests. In particular, the temperature control can be implemented in the device in various ways. Due to its microscopic size the device is particularly suitable for adjusting volumes in the microliter and nanoliter range to the desired temperature within a very short time which reduces the cycle times of the amplification steps. In the case of such small liquid volumes it is particularly necessary to prevent evaporation of the liquid reaction mixtures. Various measures are suitable for this. In particular, the aqueous phase (the actual PCR reaction mixture) can be overlayered with a medium that does not mix with this aqueous phase and has a higher boiling point than water, for example, mineral oil. In other embodiments a suitable selection of the inner volume of the device can have the effect that an appropriate vapour pressure is rapidly built up which prevents further evaporation of the reaction solution especially when the volume surrounding the liquid is very small. In other embodiments this can be achieved by carrying out the reaction at a very high air humidity or vapour saturation. The cyclic control and adaptation of the temperature of the reaction mixture can be achieved in various ways. In particular, the entire device or certain parts of the device which contain the reaction mixture can be heated or cooled from outside. Very rapid temperature changes are achieved by the devices according to the invention because of the volume of the liquid to be heated can be very small and the device can be composed of materials which have a very high thermal conductivity. In other embodiments according to the present invention various temperature-controlled zones are present in which case the temperature generation and regulation can be achieved with methods known to a person skilled in the art. In particular, heating or cooling elements can be installed in the detection plane. These are actuated from outside in such a manner that the different temperatures required for the PCR amplification at various sites of the device are adjusted permanently or temporarily. These areas that are set to a certain temperature or the heating elements are considered as sites of examination or sensory elements in the sense of the invention since the specific amplification reaction for detecting the analyte can only occur at these sites by means of the temperature controlled elements. Thus the heating elements or the detection plane can be designed as in all previously described embodiments. In this connection, typical embodiments in which the different temperature zones are defined by reductions in the distance between the transport plane and cover where the heating elements are at these sites with the reduced gap and the reaction mixture at these sites is in direct contact with the cover or with the heating elements located there. The reaction mixture can then be moved with the aid of the transport plane to the respective preheated areas in the device in order to carry out the DNA amplification. Heat is typically emitted from the cover by direct liquid contact with additional intermixing of the reaction mixture, for example, by means of acoustic surface waves or by electrowetting, but embodiments are also conceivable which operate without an additional intermixing of the reaction mixture or without a direct heat transfer or with heat that is fed in from the sides or bottom. Analytes can be detected by means of PCR methods in various ways. In particular, it can be carried out by so-called real time PCR methods in a manner known to a person skilled in the art and if a material is selected with a high transparency the fluorescence measurement used in these methods can either take place from the side of the transport plane or from the side of the detection plane. Furthermore, it is also possible to carry out a so-called end-point PCR in a manner known to a person skilled in the art in which case at the end of the reaction the product is moved into a detection area where appropriate nucleic acid sequences are present which have been immobilized there as specific template probes. This area can advantageously also be temperature-controlled in order to ensure a specific hybridization. The detection is then carried out using methods known to a person skilled in the art and in general any known post-PCR detection methods are suitable.

In order that the invention may be more readily understood, reference is made to the following examples, which are intended to illustrate the invention, but not limit the scope thereof.

Referring initially to FIG. 1, this figure shows a top-view of an embodiment of a device according to the present invention which is suitable for determining analytes such as ions with the aid of integrated ion-selective electrodes. The transport plane is in the form of flat substrate (1). In the embodiment shown, the liquid transport is achieved by acoustic surface waves. For this purpose several interdigital transducer elements (7) which can be actuated by means of the accompanying electrical contacts (12) are arranged on a piezoelectric element in the edge regions of the substrate (1) and generate the acoustic surface waves necessary for the transport. The device also contains a cover (2) which is located at a particular distance from the substrate (1) and contains the sensory elements at the site of examination (21) which in the present example are three ion-selective electrodes (14) and the reference electrode (15) and thus corresponds to the detection plane. In the present case, the distance between the two planes is determined by the closures (13). After application through one of the shown septa (11) the liquid volumes (in the present example the liquid sample to be examined (19) and a reference electrolyte solution (20)) can be moved to the site of examination (21). In the present case the site of examination (21) is designed such that the distance between the substrate (1) of the transport plane and the cover (2) is reduced in this area by a local lowering of the cover (2). In this manner the liquid to be examined (19) or the reference solution (20) comes into contact with the ion-selective electrodes (14) and the reference electrode (15) at the site of examination (21). The electrode signals are fed to an evaluation unit by means of the accompanying electrical contacts (17) and (23). After determining the potentials between the ion-selective electrodes (14) and the reference electrode (15), the combined liquid volumes (19) and (20) are then moved by acoustic surface waves into the waste container (4) which in the present case is equipped with a suction fleece (5) to take up liquid and is separated by an orifice (16) from the transport plane. Typical movement paths (18) are shown in order to illustrate the routes along which the liquid volumes move.

Figure 2:
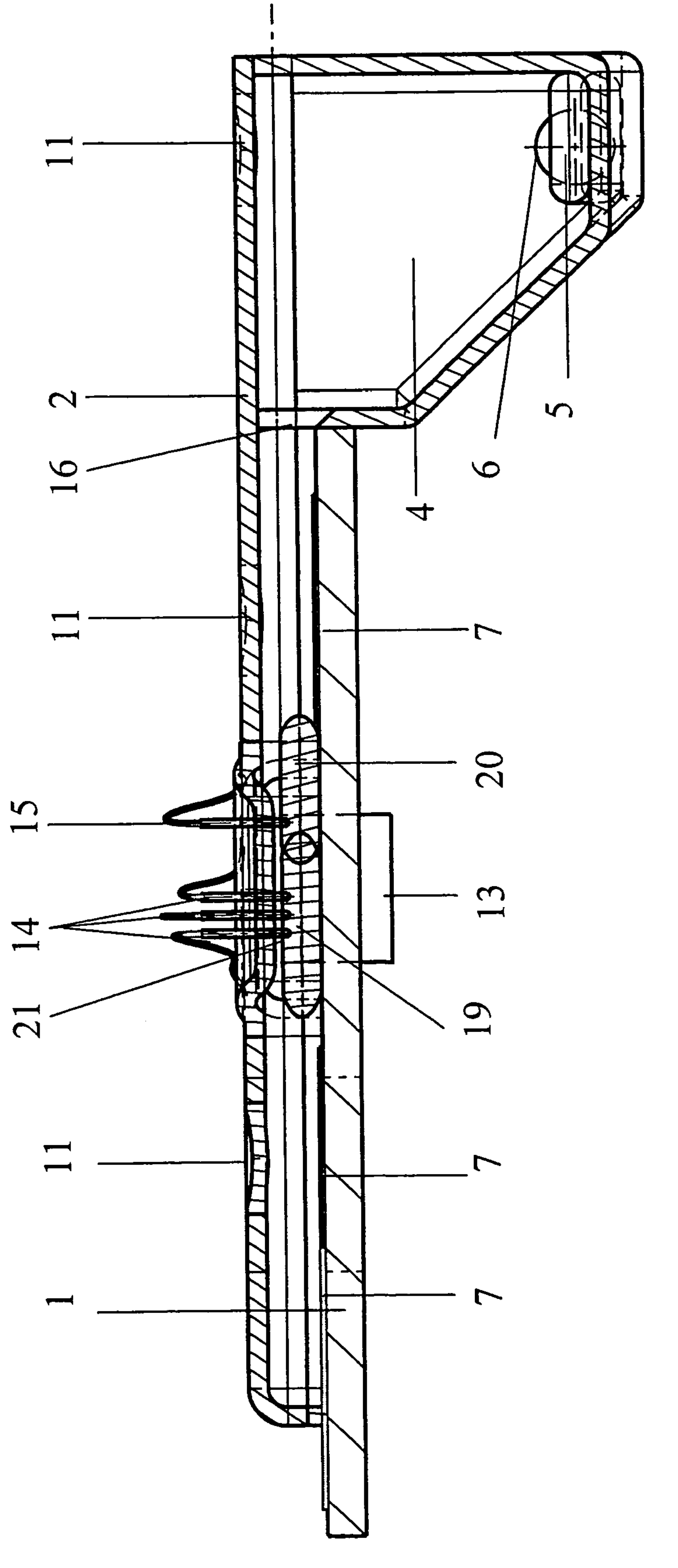
FIG. 2 shows a cross-sectional view of the device of FIG. 1 along the indicated line A-A.

FIG. 2 shows a sectional view of the device of FIG. 1 along the indicated line A-A. The liquid sample (19) to be examined is applied to the substrate (1) of the transport plane through a septum (11). The liquid to be examined is moved to the site of examination (21) by acoustic surface waves generated by transducer elements (7), the site of examination (21) being distinguished by a lowering of the cover (2) towards the substrate (1) of the transport plane. In the present example, three ion-selective electrodes (14) are attached there as sensory elements which additionally protrude from the cover (2) in order to make a direct contact with the liquid to be examined. The reference electrolyte solution (20) is applied to the substrate (1) of the transport plane in the same manner through another septum and is moved under the reference electrode (15). Both liquid volumes (19) and (20) come into contact at the site of examination (21) and are thus joined in a conductive manner without any initial intermixing. After the measurement is completed, the combined liquid volume is moved through an orifice (16) into a waster container (4) and is absorbed there in the form of a waste drop (6) onto a suction fleece (5).

Figure 3:
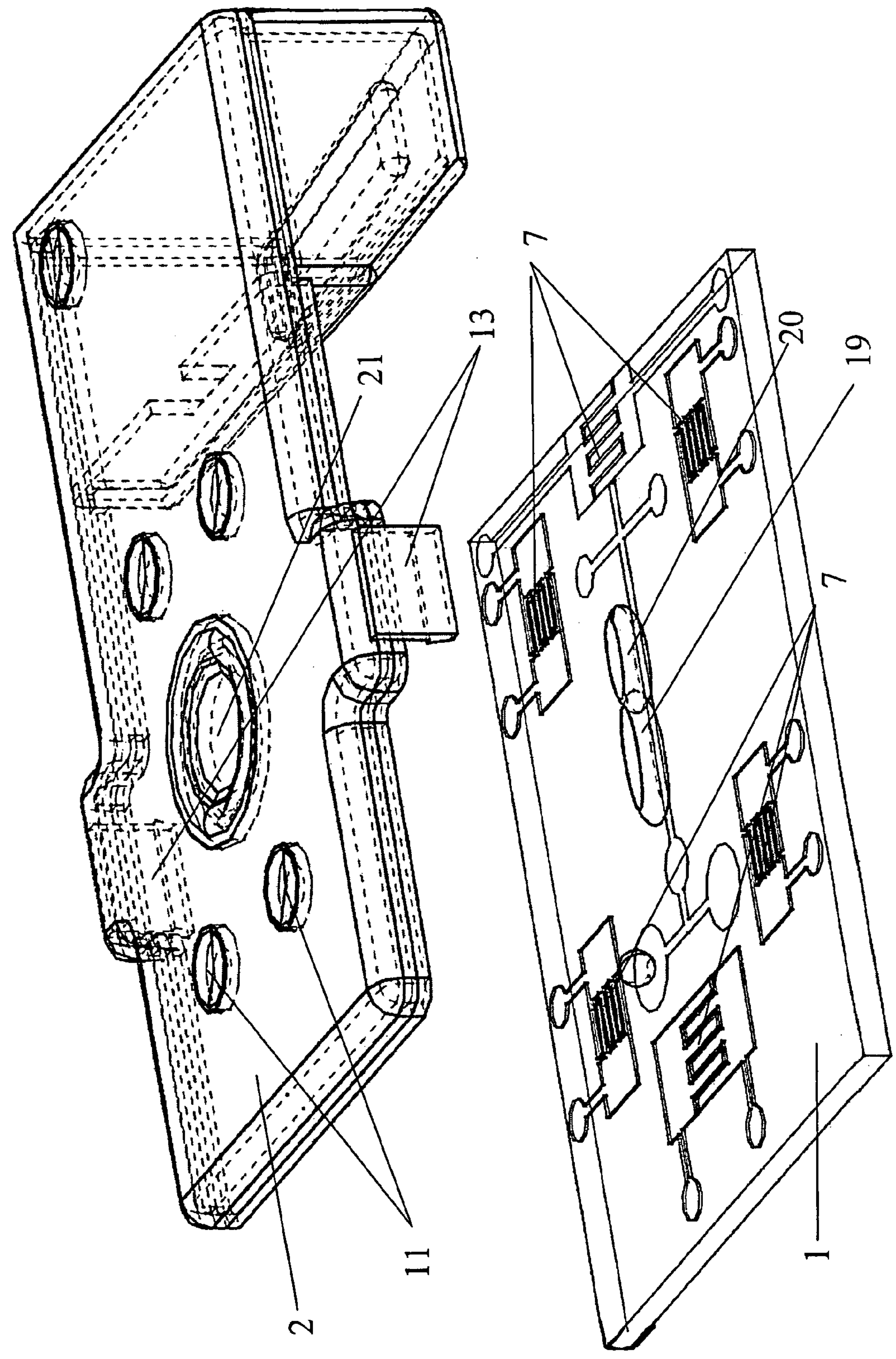
FIG. 3 shows an exploded diagram of a device corresponding to FIGS. 1 and 2.

FIG. 3 shows an exploded diagram of a device corresponding to FIGS. 1 and 2. For better illustration the substrate (1) of the transport plane is separated from the cover (2) in this diagram. For reasons of clarity the electrodes integrated into the cover (2) at the site of examination (21) and the accompanying conducting paths and contacts are not shown. This figure clearly shows that the substrate (1) represents the transport plane on which the liquid volumes are moved and which contains the transducer elements (7) which generate the forces to transport the liquid volumes (19) or (20). The cover (2) which contains the sensory elements at the site of examination (21) is functionally separate from the transport plane. The two functionally different parts (1) and (2) of the device are connected together by fasteners (13). These fasteners ensure that the substrate (1) of the transport plane and the cover (2) are functionally separated from one another, i.e., they are spaced apart to such an extent that they do not significantly affect each other's functions. In particular, the spacing outside the site of examination (21) is so large that the liquid volumes are only in contact with the substrate (1) of the transport plane and can be moved on this plane without any influence by the sensory elements in the cover (2). On the other hand, at the sites of examination (21) the liquid volumes are in close contact with the sensory elements where transport is undesired. This contact can be the result of permanent as well as temporary reductions in the distance between the cover (2) and the sensory elements at the site of examination (21).

Figure 4:
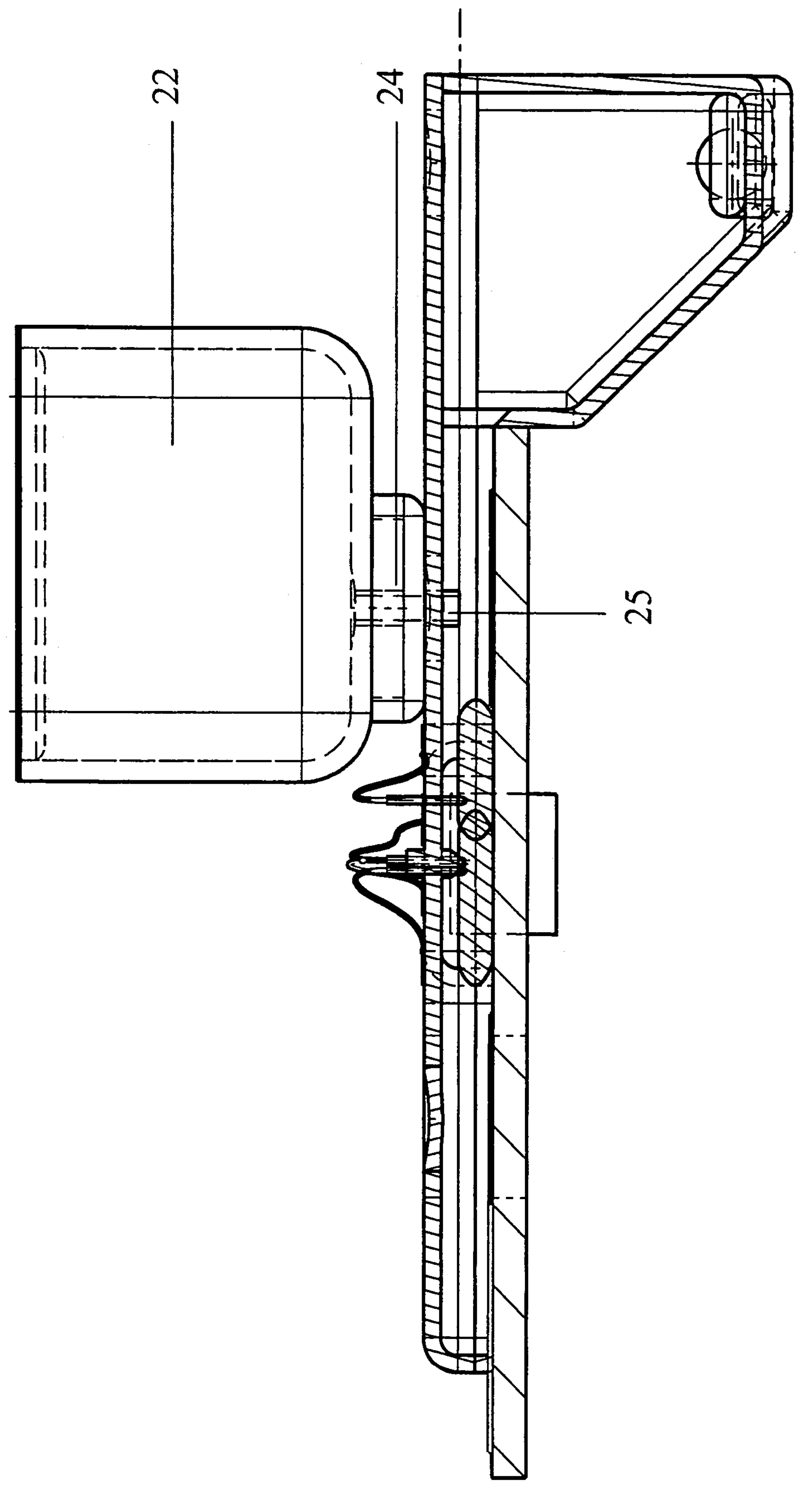
FIG. 4 shows a device according to an extended embodiment of the present invention as shown in FIGS. 1 and 2.

FIG. 4 shows an extended embodiment of a device according to the invention as shown in FIGS. 1 and 2. This embodiment additionally contains a reagent container (22) which contains the reference electrolyte solution. The appropriate volume of reference electrolyte solution is introduced into the closed device through a nozzle (25) by means of a dosing device (24) such as a piezoelectric microdispenser. Other fluids such as calibration solutions or cleaning solutions can also be introduced into the device in a similar manner. For this purpose several reagent containers may be connected to the device.

Figure 5:
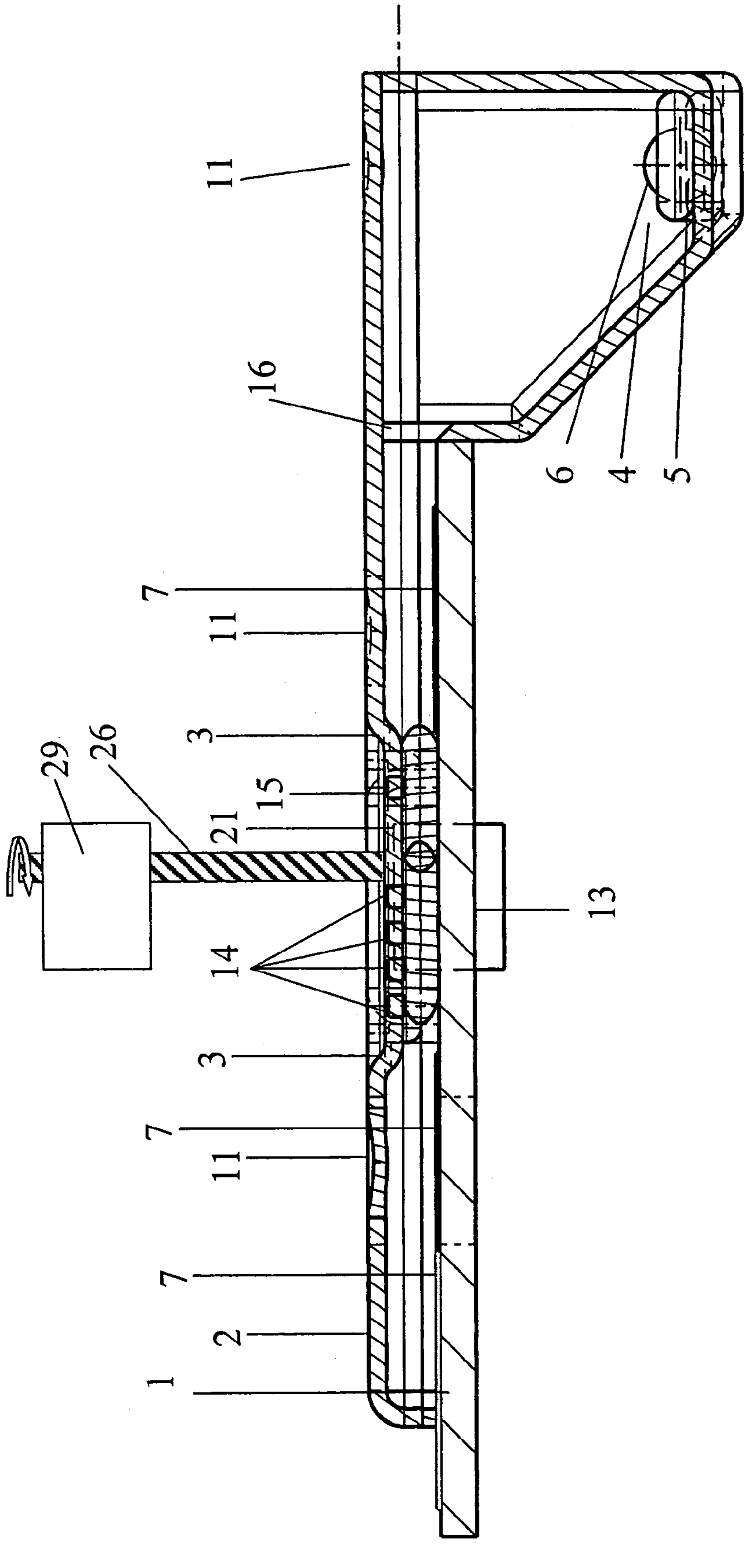
FIG. 5 shows a cross-sectional view of a device according to an embodiment of the present invention which is suitable for determining analytes such as ions with the aid of thick film electrodes.

FIG. 5 shows a sectional view of an embodiment of a device according to the invention which is suitable for determining analytes such as ions with the aid of thick film electrodes. The basic construction of the device corresponds to FIGS. 1 and 2. The sensor electrodes (14) and (15) in this embodiment are not designed as pen-shaped electrodes but are rather applied to the underside of the cover (2) in the form of thick film electrodes having a thickness in the micrometer range. In this embodiment the thick film electrodes (14) are contacted with the liquid sample to be examined (19) or the thick film electrode (15) is contacted with the reference electrolyte solution (20) in particular by a spatially limited lowering of the cover (2) in the area of the site of examination (21). For this purpose certain areas (3) of the cover (2) are elastic such that the area of the cover (2) which contains the sensory electrodes can be moved towards the substrate (1) of the transport plane in order to determine the analyte and contact can be made between the thick film electrodes and the liquid volumes. Such elastic areas (3) can, for example, be obtained by so-called hard-soft injection moulding processes as described in the European Patent Document EP 0 779 226. In the present embodiment the sensory area (21) is lowered by a step motor (29) which is connected to the upper side of the cover (2) in the area of the sensory electrodes by means of a spindle (26) and can thus move the sensory area towards or away from the substrate (1) of the transport plane. This area can be moved away again from the substrate (1) of the transport plane after the measurement in order to allow the liquids to be transported into the waste container (4). In other embodiments that are not shown the entire cover (2) can be moved towards the other plane in order to determine the analyte or the thick film electrodes are located in areas of the cover (2) which are at a permanently reduced distance to the substrate (1) of the transport plane.

Figure 6:
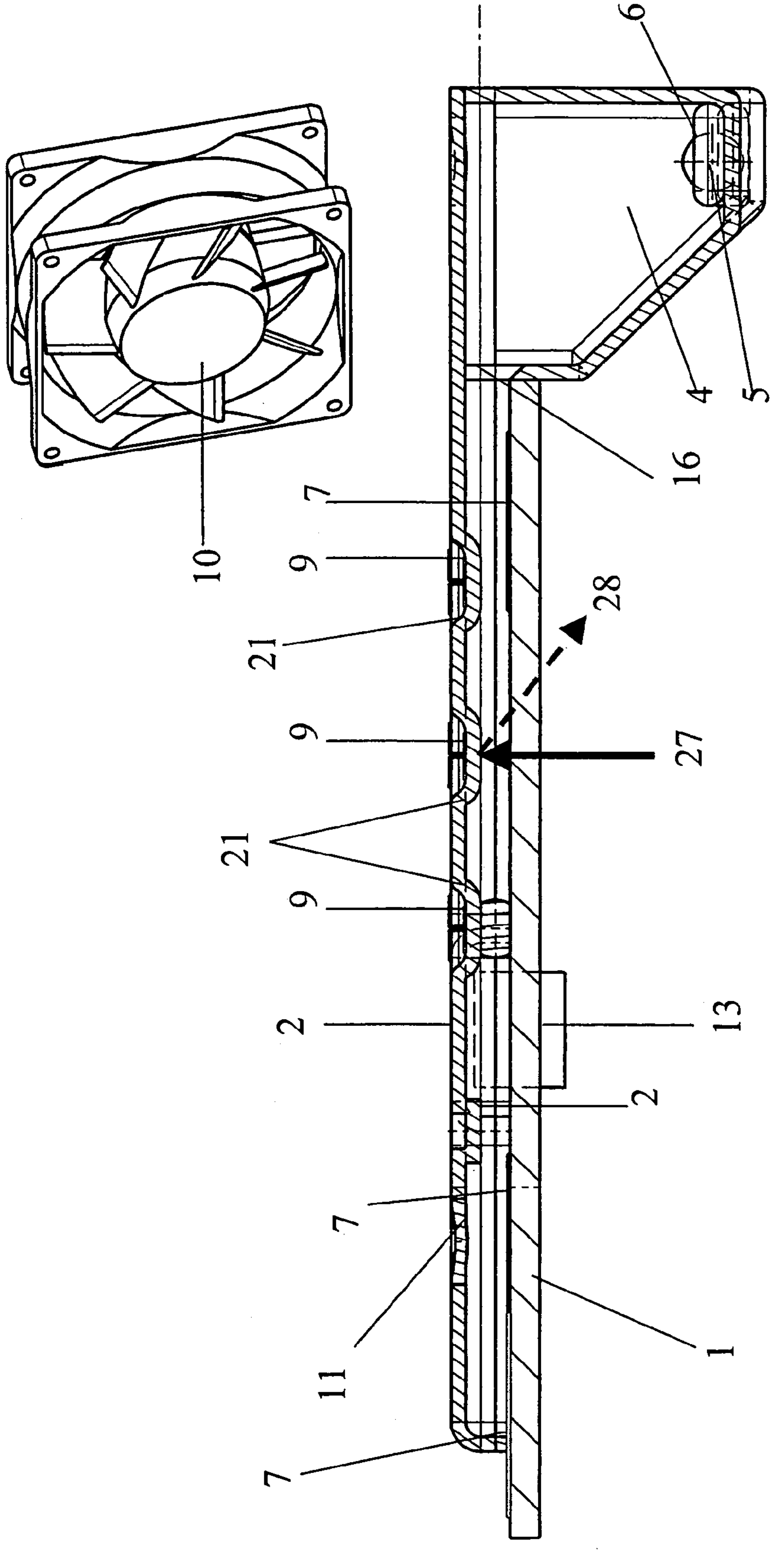
FIG. 6 shows a cross-sectional view of a device according to an embodiment of the present invention which is suitable for carrying out PCR reactions and especially for determining analytes by means of real time PCR.

FIG. 6 shows a sectional view of an embodiment of a device according to the present invention which is suitable for performing PCR reactions and especially to determine analytes by means of real time PCR. The basic construction of the device corresponds to FIGS. 1 and 2 but, due to the different detection techniques, the sensory electrodes and the corresponding contacts are omitted in this embodiment. Instead, several heating elements (9) which can be set to different temperatures and which set the PCR reaction mixtures that are located below to the temperature that is required for the corresponding reaction step of the PCR are located in the cover (2). Excess heat can be dissipated by a ventilator (10). Heat is typically emitted on the cover side by direct liquid contact with additional intermixing of the reaction mixture, but other embodiments are conceivable which operate without an additional intermixing of the reaction mixture or with indirect heat transfer or in which heat is fed in from the sides or bottom. In the embodiment shown the heating elements (9) are located in permanently lowered areas (21) of the cover (2) so that direct contact with the reaction mixture and thus a very rapid temperature exchange can only occur at these specific positions without resulting in an excessive heating of other areas of the device. However, like the aforementioned embodiments, the said variations of the design of the device and especially heating elements (9) that can be temporarily lowered are also possible. In order to perform the PCR, the reaction mixture is moved over the transport plane in a certain order and comes into contact with the heating elements (9) in the heating element areas such that the temperature required for the respective reaction step is reached at these positions. For the next PCR cycle the reaction mixture is again transported to the initial position and the various temperature steps are again performed. The detection of the analyte and in particular the specific nucleic acid is carried out in a manner known to a person skilled in the art. In the device shown the nucleic acids are detected by means of optical fluorescence methods. In this case the excitation light (27) for the real time PCR probes is irradiated from below and the emitted fluorescence light (28) is also again measured from below. This is due to this type of construction and the radiation processes can also proceed in a different manner especially in the case of other arrangements of the heating elements (9) or an indirect temperature transfer or when transparent materials are used. Furthermore, it is also possible to design the heating elements (9) in a ring-shape so that the optical determination can be carried out through the opening in the middle of the ring.

Figure 7:
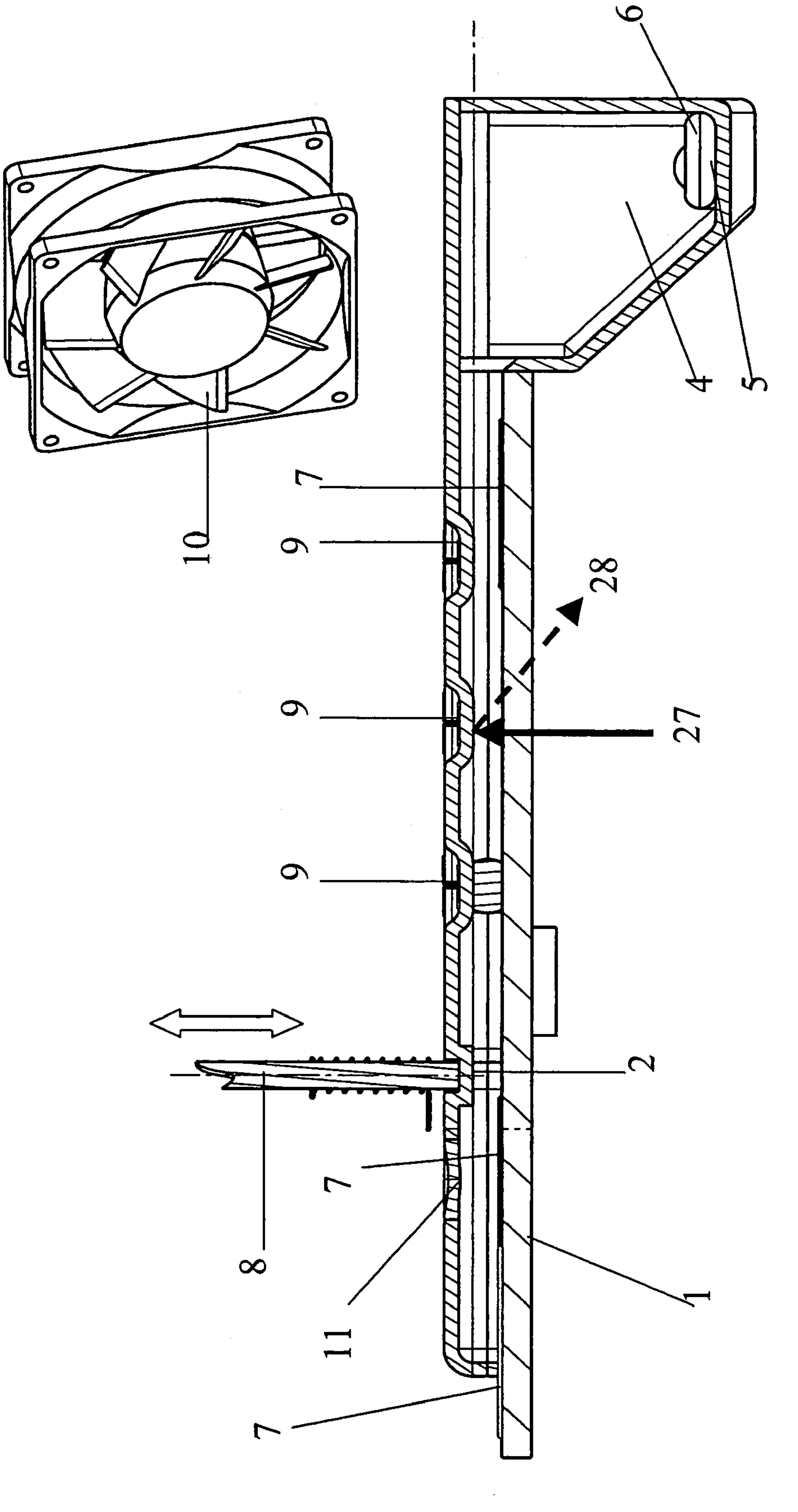
FIG. 7 shows a device according to an extended embodiment of the present invention using an extension of FIG. 6 as an example which can be used to carry out washing steps in a closed device.

FIG. 7 shows an extended embodiment of a device according to the present invention using an extension of FIG. 6 as an example which can be used to carry out washing steps in a closed device. For this purpose the substances and in particular the analyte for which a change in medium is required are firstly bound to magnetic particles in a manner known to a person skilled in the art. Subsequently, the liquid volume containing the substances treated in this manner is moved to a certain site within the device which is located below a horizontally movable magnet (8). If the magnet (8) is now lowered (shown in FIG. 7) the magnetic particles and the substances bound thereto are subjected to an attractive force and are retained on the underside of the cover (2) by the magnet (8). The liquid volume can now be transported away without also removing the substances bound to the magnetic particles. Subsequently, another liquid volume with a different composition can be moved to this site. If the magnet (8) is now moved away again, the magnetic force of attraction between the magnet (8) and the magnetic particles with the bound substances decreases so that the substances can redisperse in the new liquid volume. After this washing step the liquid segment can now run through further reaction steps, in particular those listed in connection with the description of FIG. 6.

Figure 8:
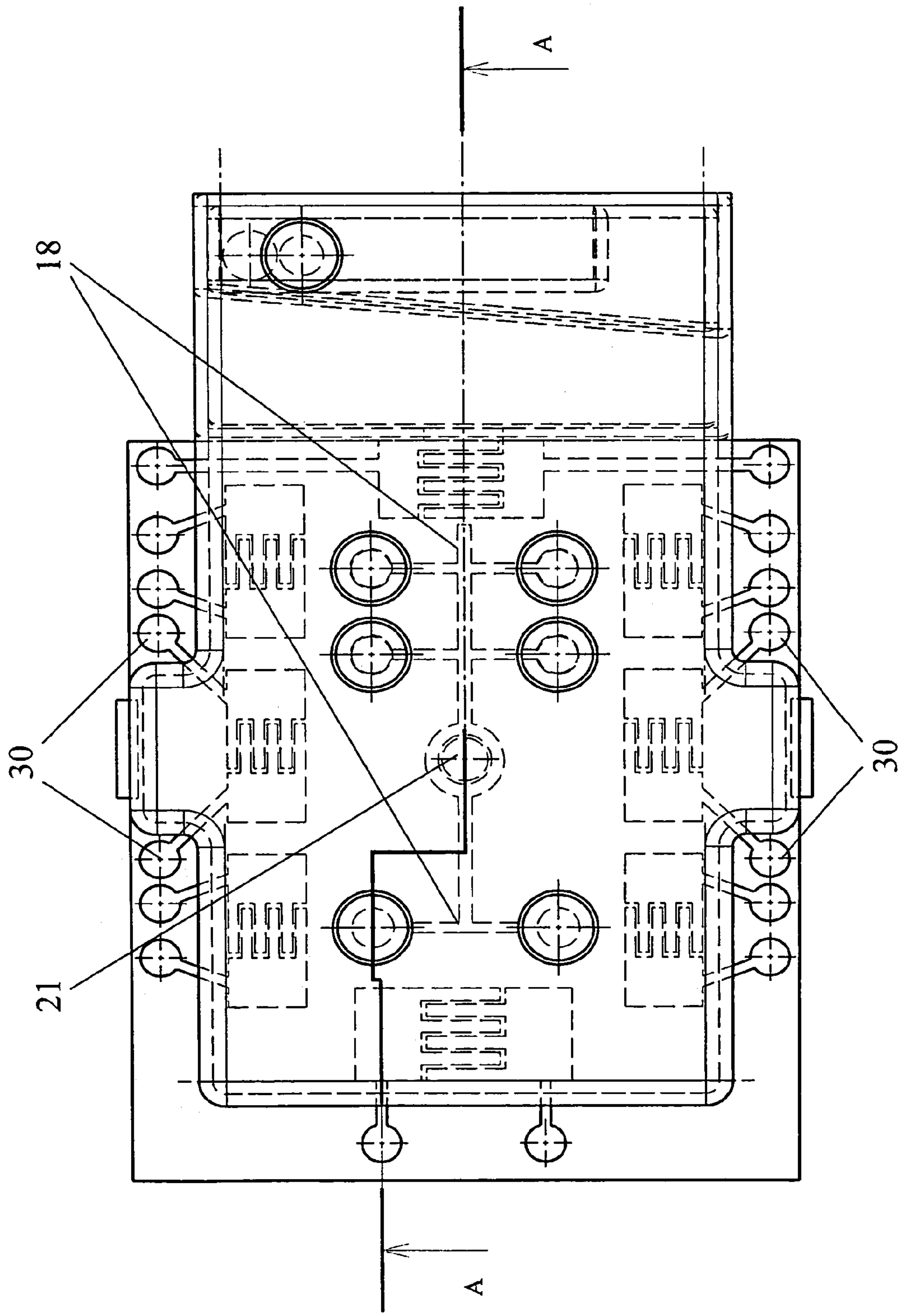
FIG. 8 shows a top-view of a device according to an embodiment of the present invention which is suitable for determining an analyte by means of a viscosity measurement.

FIG. 8 shows a top view of an embodiment of a device according to the present invention which is suitable for determining analytes by means of a viscosity measurement. The basic construction of the device corresponds to FIG. 1. The change in viscosity of the reaction mixture located at position (21) can be monitored over time with the aid of the electrodes (30) by determining the influence on acoustic surface waves as described for example in WO 01/20781. The coagulation time of a sample can be determined in this manner. After the reaction a regeneration reagent is fed in via the movement paths (18). This is also transported into the waste container (4). The device is then ready for another measurement.

It is noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A microfluidic device for determining an analyte in a liquid sample that has a volume in a range from about 100 nl to about 10 μl, comprising:

a transport plane comprising a flat substrate, the substrate comprising a sample application site, an examination site, and a path connecting the sample application site to the examination site, along which the liquid sample is movable from the sample application site to the examination site by acoustic surface waves or electrowetting;

transducer elements attached to the substrate or located outside of the substrate, wherein the transducer elements provide movement to the liquid sample; and a cover with side walls that enable the construction of a closed microfluidic device having a pierceable septum for injecting the liquid sample, and an electrode for sensing the analyte in the liquid sample, wherein in the closed microfluidic device, the septum is aligned with the sample application site and the electrode protrudes from the cover toward the substrate at the examination site, and wherein the cover has such a shape that the distance between the cover and the sample application site is greater than the distance between the cover and the examination site, so that the liquid sample does not contact the cover at the sample application site and the electrode contacts the liquid sample at the examination site.

2. The device of claim 1 wherein the transducer elements are piezoelectric elements.

3. The device of claim 1, further comprising a waste container connected to the device by an orifice in a closed side of the device.

4. The device of claim 3, wherein the waste container provides a suction fleece.

5. The device of claim 1, wherein the cover includes additional pierceable septa aligned with corresponding ones of additional reagent application sites of the substrate.

6. The device of claim 1, wherein the cover further comprises a fastener for securing the cover to the transport plane.

7. The device of claim 1, wherein the electrode is pen-shaped.

8. The device of claim 1 further comprising temperature-controlled areas integrated into the cover.

9. The device of claim 1 further comprising a reagent container connected to a dosing device having a nozzle, the nozzle positioned in an opening in the cover of the microfluidic device, wherein the nozzle of the dosing device is operable to introduce a reagent from the reagent container to the substrate of the microfluidic device through the opening in the cover of the microfluidic device.

10. A microfluidic device for determining an analyte in a liquid sample that has a volume in a range from about 100 nl to about 10 μl, comprising:

a transport plane comprising a flat substrate, the substrate comprising a sample application site, an examination site, and a path connecting the sample application site to the examination site, along which the liquid sample is movable from the sample application site to the examination site by acoustic surface waves or electrowetting;

transducer elements attached to the substrate or located outside of the substrate, wherein the transducer elements provide movement to the liquid sample; and a cover with side walls that enable the construction of a closed microfluidic device having a pierceable septum for injecting the liquid sample and an elastic portion that defines an area which incorporates an electrode for sensing the analyte in the liquid, wherein in the closed microfluidic device, the septum is aligned with the sample application site and the electrode and the elastic portion of the cover is mechanically movable such that the electrode may be moved toward the substrate from a first distance from the substrate, at which the electrode incorporated into the elastic portion does not contact the liquid at the examination site, to a second distance from the substrate, at which the electrode incorporated into the elastic portion contacts the liquid at the examination site.

11. The device of claim 10, wherein the electrode is a thick film electrode applied to a side of the elastic portion of the cover facing the substrate.

12. The device of claim 10 further comprising a motor driven spindle which mechanically moves the elastic portion.

13. The device of claim 11 further comprising a motor driven spindle which moves the elastic portion, wherein the spindle engages a side of the elastic portion opposite the side having the film electrode.

14. The device of claim 10 wherein the transducer elements are piezoelectric elements.

15. The device of claim 10, further comprising a waste container connected to the device by an orifice in the closed side of the device.

16. The device of claim 15, wherein the waste container provides a suction fleece.

17. The device of claim 10, wherein the cover includes additional pierceable septa aligned with corresponding ones of additional reagent application sites of the substrate.

18. The device of claim 10, wherein the cover further comprises a fastener for securing the cover to the transport plane.

19. The device of claim 10 further comprising temperature-controlled areas integrated into the cover.

20. The device of claim 10 further comprising a reagent container connected to a dosing device having a nozzle, the nozzle positioned in an opening in the cover of the microfluidic device, wherein the nozzle of the dosing device is operable to introduce a reagent from the reagent container to the substrate of the microfluidic device through the opening in the cover of the microfluidic device.

* * * * *